(12) United States Patent
Raju et al.

(10) Patent No.: US 9,870,224 B1
(45) Date of Patent: Jan. 16, 2018

(54) ASSESSING QUALITY OF CODE IN AN OPEN PLATFORM ENVIRONMENT

(71) Applicant: Amazon Technologies, Inc., Seattle, WA (US)

(72) Inventors: Gurinder Raju, Seattle, WA (US); Oleg Oleg Pistolet, Seattle, WA (US); Seth Bradon Kinast, Seattle, WA (US); Cameron Dailey Austgen, Seattle, WA (US); Jay Austin Crosley, Redmond, WA (US); Shashank Shekhar, Seattle, WA (US); Satish Kumar Eerpini, Sunnyvale, CA (US); Teresa Shuk Kwan Lau, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 404 days.

(21) Appl. No.: 14/751,006

(22) Filed: Jun. 25, 2015

Related U.S. Application Data

(63) Continuation of application No. 14/197,131, filed on Mar. 4, 2014, now Pat. No. 9,110,770.

(51) Int. Cl.
   *G06F 9/44* (2006.01)
   *G06Q 10/06* (2012.01)
   *G06N 5/02* (2006.01)

(52) U.S. Cl.
   CPC .............. *G06F 8/77* (2013.01); *G06F 8/10* (2013.01); *G06F 8/71* (2013.01); *G06Q 10/06395* (2013.01); *G06N 5/022* (2013.01)

(58) Field of Classification Search
   CPC .... G06F 8/10; G06F 8/71; G06F 8/77; G06Q 10/06395; G06N 5/022
   USPC ........................................................ 717/101
   See application file for complete search history.

(56) References Cited

U.S. PATENT DOCUMENTS

| | | | | |
|---|---|---|---|---|
| 8,332,517 | B2 * | 12/2012 | Russell | G06Q 30/0631 705/50 |
| 2002/0026398 | A1 * | 2/2002 | Sheth | G06Q 30/0601 705/37 |
| 2007/0006041 | A1 * | 1/2007 | Brunswig | G06F 11/3688 714/38.14 |
| 2009/0144698 | A1 * | 6/2009 | Fanning | G06F 8/75 717/120 |

(Continued)

OTHER PUBLICATIONS

Guha et al., "Impact of Web 2.0 and Cloud Computing Platform on Software Engineering", IEEE, 2010, 6pg.*

(Continued)

*Primary Examiner* — Ryan Coyer
(74) *Attorney, Agent, or Firm* — Kilpatrick Townsend & Stockton LLP

(57) ABSTRACT

Techniques for driving higher quality of code may be provided. For example, code may be received for hosting on a computing resource. A computing service may be implemented to analyze the code prior to the hosting. The analysis may include assessing components of the code against criteria associated with code performance. Based on the analysis, the computing service may determine a quality of the code, provide recommended changes to the code that may improve the quality, and identify a proper computing resource for hosting the code at the quality.

20 Claims, 8 Drawing Sheets

(56) References Cited

U.S. PATENT DOCUMENTS

| | | | | |
|---|---|---|---|---|
| 2011/0213678 | A1* | 9/2011 | Chorney | G06Q 30/06 705/26.61 |
| 2011/0218920 | A1* | 9/2011 | Agrawal | G06Q 30/0283 705/50 |
| 2011/0276354 | A1* | 11/2011 | Bijani | G06Q 10/00 705/7.11 |
| 2011/0307304 | A1* | 12/2011 | Mercuri | G06Q 10/10 705/12 |
| 2012/0159420 | A1* | 6/2012 | Yassin | G06F 11/3672 717/101 |
| 2013/0046585 | A1* | 2/2013 | Bang | G06F 8/20 705/7.38 |
| 2014/0157239 | A1* | 6/2014 | Goetsch | G06F 11/3604 717/126 |

OTHER PUBLICATIONS

Queinnec, Christian, "An Infrastructure for Mechanized Grading", HAL, 2009, 9pg.*

Sobel et al., "Cloudstone: Multi-Platform, Multi-Language Benchmark and Measurement Tools for Web 2.0", Academia.edu, 2008, 6pg.*

U.S. Appl. No. 14/197,131, filed Mar. 4, 2014, Titled: Assessing Quality of Code in an Open Platform Environment.

U.S. Appl. No. 14/197,131, "Notice of Allowance", dated Apr. 10, 2015, 19 pages.

Han et al., "Efficient Service Recommendation System for Cloud Computing Market", Communications in Computer and Information Science, vol. 63, 2009, pp. 117-124.

He et al., "QoS-Driven Service Selection for Multi-Tenant SaaS", 5th International Conference on Cloud Computing (CLOUD), Jun. 2012, pp. 566-573.

Limam et al., "Assessing Software Service Quality and Trustworthiness at Selection Time", IEEE Transactions on Software Engineering, vol. 36, Issue: 4, Jan. 15, 2010, pp. 559-574.

Rehman et al., "Towards Multi-Criteria Cloud Service Selection", Fifth International Conference on Innovative Mobile and Internet Services in Ubiquitous Computing (IMIS), 2011, pp. 44-48.

Wu et al., "SLA-based Resource Allocation for Software as a Service Provider (SaaS) in Cloud Computing Environments", 2011 11th IEEE/ACM International Symposium on Cluster, Cloud and Grid Computing (CCGrid), May 2011, pp. 195-204.

* cited by examiner

US 9,870,224 B1

ASSESSING QUALITY OF CODE IN AN OPEN PLATFORM ENVIRONMENT

CROSS-REFERENCE TO RELATED APPLICATION

This application is a continuation of U.S. patent application Ser. No. 14/197,131, filed Mar. 4, 2014, entitled "ASSESSING QUALITY OF CODE IN AN OPEN PLATFORM ENVIRONMENT," the content of which is hereby incorporated by reference in its entirety.

BACKGROUND

Users operate various computing devices to access online resources that offer a wide range of rich features and functionalities. For example, an electronic marketplace of a service provider may allow merchants to offer items for sale and consumers to search, review, and purchase items. Such functionalities may be supported in various ways including using code of the service provider in a closed platform and/or code of the service provider and the merchants in an open platform. For example, in the closed platform, the electronic marketplace may execute code of the service provider to implement a computing service. This computing service may allow a merchant to log-in to a merchant account, submit descriptions of an item, and list the item on a web site of the electronic marketplace. In another example, in the open platform, the electronic marketplace may configure the computing service to receive code from the merchant, such as web site code. In turn, the computing service may deploy the merchant's code to a computing resource of the electronic marketplace resulting in the electronic marketplace hosting a web site of the merchant.

When code of a merchant is used in an open platform, an electronic marketplace may not necessarily have control over the quality of the code. In other words, although the merchant may develop the code offline using some guidelines or framework from the electronic marketplace, the merchant may not carefully consider, for example, the overall impact to the electronic marketplace when the code is executed along with code from other merchants. As such, challenges may exist within the open platform.

BRIEF DESCRIPTION OF THE DRAWINGS

Various embodiments in accordance with the present disclosure will be described with reference to the drawings, in which.

DETAILED DESCRIPTION

Figure 1:
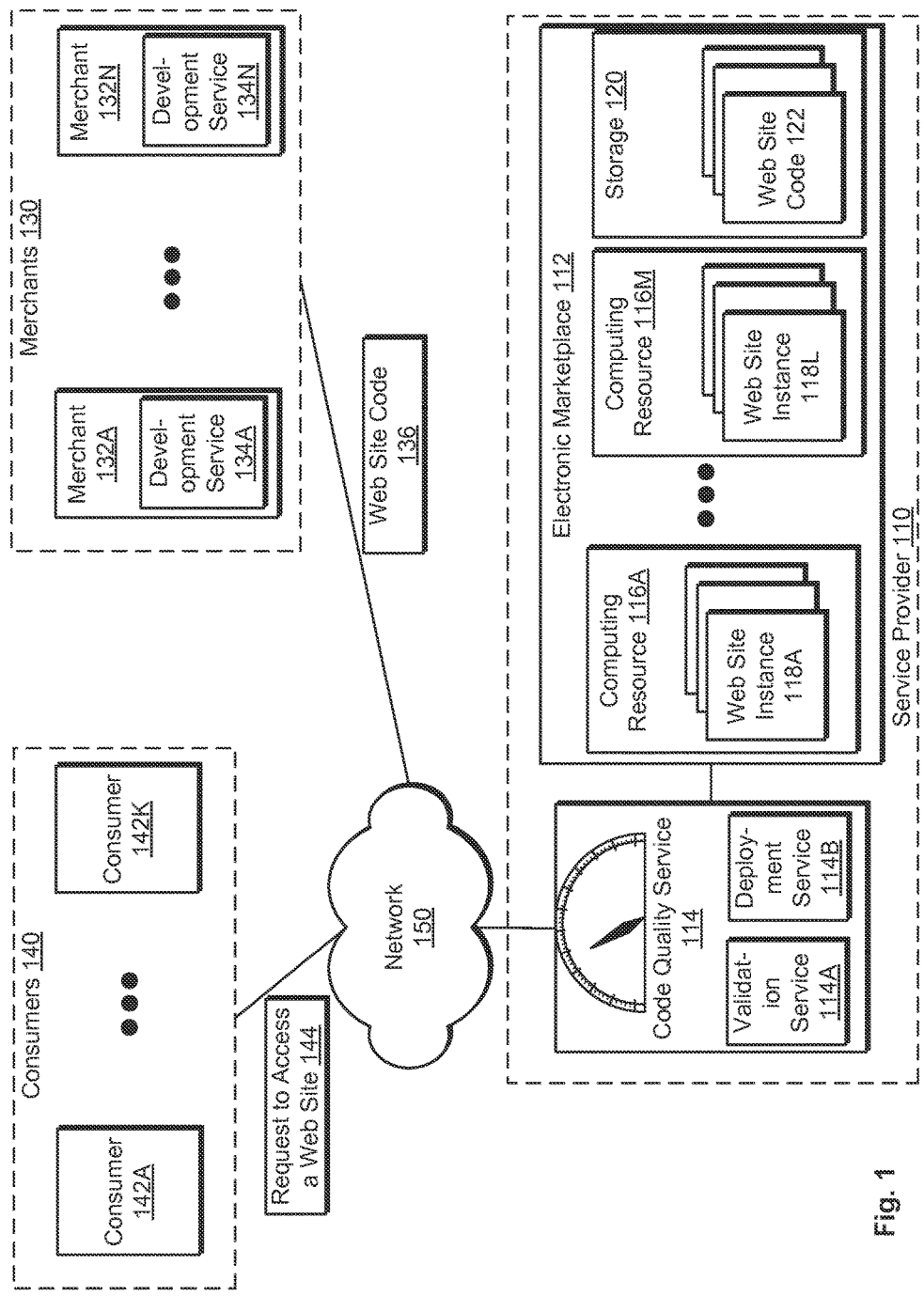
FIG. 1 illustrates an example computing environment for determining and improving code quality, according to embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, improving quality of code to be hosted in an open platform, such as web site code. Specifically, a service provider of the open platform may implement a code quality service that may assist a merchant in developing and submitting code and may assist the service provider in deploying the code in the open platform. For example, while the merchant is developing the code, the code quality service may determine and inform the merchant about a development quality of the code. To drive higher code quality, the service provider may incentivize the merchant to submit the code at a higher development quality. To do so, the service provider may lower the fees for hosting such higher quality code in the open platform. Similarly, while validating the code for deployment, the code quality service may determine and inform the merchant and the service provider about a validation quality of the code. This validation may allow the merchant another opportunity to improve the code quality and may allow the service provider to deploy the code to a computing resource best fitted to execute the code. Additionally, post deployment, the code quality service may monitor the operational costs of running the code in the open platform to derive and inform the merchant and the service provider of an operational quality of the code. In turn, the merchant may decide whether the operational quality is acceptable or whether new code should be submitted. This decision may be based on incentives to continuously improve the code quality. Also, the service provider may refine the deployment of the code to reduce a cost, such as a computational cost, for running the code in the open platform.

To illustrate, a service provider of an electronic marketplace may implement a web store service that may allow merchants to create custom e-commerce web sites hosted in the electronic marketplace. Joe, a merchant of clothing items, may desire to use the web store service to develop a web site for selling the clothing items. The web store service may provide a software development kit (SDK) for developing code of the web site. The SDK tool may integrate a development service configured to assist Joe in writing the code. For example, the development service may allow Joe to set a target for the code quality and, as the code is developed, may inform Joe whether the target is met and, if not, what changes can be made to meet the target. If the target is met, the development service may allow Joe to submit the code to the web store service. In turn, the web store service may similarly implement a validation service configured to validate the quality of the received code. If discrepancies between the validated quality and the target quality are detected, the validation service may inform Joe accordingly and request an authorization to deploy the code at the validated quality or a re-submission of the code at a higher quality. As such, the code can be deployed at a known quality to a computing resource having a configuration that may run the code at the lowest possible computational cost given the quality. Further, once deployed, the web store service may implement an operation service configured to assess the quality of the code in operation. As such, if the quality is lower than expected, the operation service may recommend changes to the code, inform Joe accordingly, and/or identify another computing resource that may run the code at a better computational cost.

In the interest of clarity of explanation, the embodiments are described in the context of an electronic marketplace, web stores, web sites, merchants, and consumers. This may include, for example, the electronic marketplace implementing an open platform and using a web store for allowing merchants to submit codes for web sites. In response to a consumer's request to access to one of the web sites, the open platform may run an instance of code corresponding to the requested web site. Nevertheless, the embodiments may be applied to any network-based resource that may implement an open platform for hosting codes and functionalities associated with users. The open platform may be managed by a service provider and may run code developed by a service provider and codes submitted by merchants. The codes of the merchants may include code for web sites, widgets, applications, and/or other type of services. More particularly, the embodiments may allow a service provider to implement a code quality service for evaluating quality of code of a user, recommend changes to the code, incentivize the user to improve the quality, and minimize operational cost for running the code.

As explained herein above, in an open platform environment, a service provider may not be able to control the quality of codes submitted by merchants because the merchants may develop and submit custom codes. As such, bad code from a particular merchant may impact other merchants' services hosted on the same open platform by, for example, slowing down the computational resources of the open platform. For example, in the open platform, codes of the merchant may be run on computational resources shared by the merchants. As such, bad code from the particular merchant may use an excessive portion of the computational resources, impacting the ability of the computational resources to run the codes of the other merchants. This may be caused by the bad code using excessive memory space, excessive central processing unit (CPU) time, a large volume of application programming interface (API) calls, calls to less efficient and deprecated APIs, excessive exception conditions, and/or other using other parameters that may negatively impact the computation resources. The impact of the bad code may also extend to the service provider and to consumers of the other merchants. For example, the service provider may suffer from a higher cost, computational and financial, to host the codes of the merchants in the open platform at a certain quality of service. Similarly, the consumers may experience a depreciating quality of service when accessing the services of the merchants facilitated by the codes hosted in the open platform.

To protect against such situations, the service provider may implement techniques for limiting the impact of the bad code to services of that particular merchant. However, these techniques may not necessarily improve the quality of submitted codes. As such, additionally or alternatively to these techniques, the service provider may implement a code quality service as described herein. This service may drive a desired behavior by incentivizing merchants to improve and submit good quality codes. Also, the code quality service may allow the service provider to minimize computational costs of hosting the codes by deploying the codes to computing resources of the open platform best fitted to run the codes given the associated qualities. These and other features are further described herein below with reference to the figures.

Turning to FIG. 1, that figure illustrates an example computing environment for implementing the techniques described herein. In particular, the illustrated computing environment may be configured to allow a service provider 110 of an electronic marketplace 112 to implement a code quality service 114. The code quality service 114 may determine quality of codes submitted by merchants 130 over a network 150 for deployment in the electronic marketplace 112. When deployed, consumers 140 may operate computing devices to access, over the network 150, services of the merchants 130 facilitated by the deployed codes.

As such, the service provider 110 may operate an electronic marketplace 112 that may facilitate interactions between the merchants 130 and the consumer 140 over the network 150. A merchant may include an item provider, a seller, or any user interfacing with the electronic marketplace 112 for offering items or for providing code. A consumer may be an item recipient, a buyer, or any user reviewing, browsing, ordering, obtaining, purchasing, or returning an item of a merchant. An item may include a tangible product (e.g., a clothing item, a music file), a service (e.g., a dry cleaning service, a music recommendation service), or other items.

More particularly, the electronic marketplace 112 may include an open platform that may allow the merchants 130 to submit code to be hosted on the open platform. For example, the open platform may allow the merchants 130 to create custom e-commerce web sites. Services of the web sites may include offering items for sale. The items may be offered at the web sites of the merchants 130 and, optionally, at a web site of the electronic marketplace 112. As illustrated in FIG. 1, the merchants 130 may include a plurality of merchants 132A-N, each of which may operate a computing device to write, develop, and submit web site code 136 to the open platform.

To facilitate the creation of the custom e-commerce web sites, the electronic marketplace 112 may implement a web store service that may provide SDKs to the merchants 130 and that may facilitate hosting services of the service provider 110. The SDKs may allow the merchants 130 to develop and submit the web site codes 136. In comparison, the hosting services may allow the service provider 110 to manage aspects of running the e-commerce web sites including, for example, design and merchandising, catalog and inventory management, order management, checkout and payment processing, fraud protection, and customer service. In addition, the hosting services may integrate other services of the electronic marketplace 112 with the e-commerce web sites, such as selling the items on the web site of the electronic marketplace 112, advertising the e-commerce web sites on such a web site, and/or other services.

To support the above functionalities, the open platform may run on various computing resources 116A-M. The computing resources 116A-M may include hardware and software such as physical servers and/or datacenters configured to implement the open platform. In another example, the computing resources 116A-M may represent virtual machines running on physical computing resources. Further, the open platform may include a storage 120 configured to store the codes received from the merchants 130 such as the web site codes 122. The storage 120 may be physical storage and/or may be virtual storage and may be integrated with or separate from the computing resources 116A-M.

In addition, the open platform may be configured to respond to a consumer request for an e-commerce web site by identifying a computing resource from the computing resources 116A-M and connecting a computing device of the consumer to the identified computing resource. In an example, the identified computing resource may run the code corresponding to the requested web site. In another example, the computing resource may launch and execute a web site instance (e.g., a virtual machine instance for a web site) using the code of the web site. As is further described herein below, the computing resource may be identified based on the quality of the code corresponding to the web site. As is illustrated in FIG. 1, there may be multiple website instances 118A-L associated with multiple consumer requests 144. Each of the web site instances 118A-L may serve one or more consumers 142A-142K and may correspond to a web site code.

As explained herein above, the service provider 110 may implement the code quality service 114 to improve the quality of submitted codes and to deploy the codes on the computing resources 116A-M in a way that may minimize the computational cost for running the codes. The code quality service 114 may be integrated in the electronic marketplace 112, such as by being implemented at a head-end server, back-end server, or being distributed between the head-end and back-end server of the open platform. Alternatively, the code quality service 114 may be separate from but interfacing with the electronic marketplace 112.

Further, the code quality service 114 may include a validation service 114A and a deployment service 114B, each of which may be configured for use at a different stage of code deployment. For example, the validation service 114A may be configured to assess a quality of code received from a merchant part of a validation process or pipeline and before deployment of the code. The validation service 114A may inform the merchant and the service provider 110 of the code quality and may recommend changes to the code for improved quality. In this way, the merchant and the service provider may have visibility of the code quality and may act based on such knowledge. For example, the merchant may submit modified code or may authorize the service provider 110 to deploy the code at the current quality. Similarly, the service provider 110 may incentivize the merchant to submit higher quality code by, for example, lowering fees for hosting good quality code. Also, the service provider 110 may use the code quality to determine what computing resource (e.g., physical and/or virtual machine) may be able to run the code at the lowest possible computational cost and may deploy the code to such a computing resource.

In comparison, the deployment service 114B may be configured to assess a quality of code already deployed. In other words, the deployment service 114B may determine the operational quality of the code. Similarly to the validation service 114A, the deployment service 114B may inform a merchant associated with the deployed code and the service provider 110 of the operational quality and may recommend changes that can lead to an improved quality. In turn, the merchant may decide to submit modified code based on the current operational quality. Likewise, the service provider 110 may re-assess whether the code should be deployed on another computing resource more suited to run the code given the operational quality.

Additionally, the code quality service 114 may not be limited to the validation service 114A and the deployment service 114B. Instead, functionalities of the code quality service 114 may be further extended to the SDKs provided to the merchants 130. In other words, the SDKs may implement, for example, functionalities for evaluating code quality and recommending changes. An example of this implementation is illustrated in FIG. 1 as development services 134A-N that may be available to the merchants 132A-N. As such, part of developing code for a web site, a merchant 132A may operate a development service 134A to assess the quality of the code in development. The development service 134 may inform the merchant 132A of the quality and may recommend quality improvements to the code. When satisfied with the quality, the merchant 132A may use the development service 134A to submit the code to the electronic marketplace 112A.

Although FIG. 1 illustrates the development service 134A, the validation service 114, and the deployment service 114B as being separate services that may be used separately and independently, these services may be integrated or may be used in conjunction. For example, the merchant 132A may use the development service 134A to submit code for a web site at a development quality. In turn, the validation service 114A may validate this quality. If discrepancies are detected, the validation service 114A may notify the merchant 132A and recommend changes accordingly. In turn, the merchant 132A may modify and re-submit the code, now at a higher development quality. This process can be re-iterated until the merchant 132A may be satisfied with the quality. At that point, the service provider 110 may use the quality to deploy the code at a proper computing resource. Once deployed, the operation service 114B may monitor the computational cost of running the code to derive an operational quality. Further, the operation service 114B may inform the merchant 132A and the service provider 110 of this quality and may recommend changes. In turn, the merchant 132A may decide whether modified code should be submitted or not. Also, the service provider 110 may determine whether the code should be deployed to another computing resource. This process can also be re-iterated until the merchant 132A may be satisfied with the operational quality and/or the service provider 110 may be satisfied with the deployment. In each of these phases, data about the quality of the code and how this quality is computed may be interchanged between the development service 134A, the validation service 114, and the deployment service 114B such that a common framework for assessing the quality may be shared, updated, and propagated between the services.

Hence, despite implementing an open platform that may allow the merchants 130 to submit various codes at various qualities, the service provider 110 may use the code quality service 114 to improve the quality of the submitted codes and to deploy the codes at the lowest possible computational cost. More particularly, the code quality service 114 may enable the service provider 110 to incentivize the merchants 130 to submit higher quality codes and to determine computing resources best fitted to run the codes. For example, the service provider may reduce a fee for a merchant for running good quality code on the open platform. In another example, if the merchant has a history of submitting high quality code, the service provider 110 may provide this merchant with access to a beta release of a functionality of the open platform that may be, otherwise, unavailable to other merchants. Similarly, the service provider 110 may reduce a flow for deploying future codes of this merchant on the open platform (e.g., by reducing the process for validating the code in the validation pipeline). The merchant may take advantage of these and other incentives because of the provided visibility of the code quality throughout the validation and operational phases and the ability to update the code as recommended.

Additionally, the code quality service 114 may enable the service provider 110 to better understand qualities of submitted codes and to take corrective and/or refining actions. To do so, the code quality service 114 may store and allow the service provider 100 to view and analyze a history of submitted codes and the associated qualities from a plurality of merchants. This may allow, for example, the service provider 110 to determine whether updates are needed for the development service 134A, the validation service 114A, and/or the deployment service 114B. For instance, in a perfect world, the code qualities assessed by these services for a particular code should be the same. However, that may not always be the case. By monitoring discrepancies between the outputs of any two or more of the services over time and over multiple merchants, the service provider 110 may fine tune the rules, criteria, and parameters that each service may use to assess code quality.

In another example, the code quality service 114 may analyze the history to predict what qualities may be expected with future code submissions. Here, the code quality service 114 may implement various prediction techniques including, for instance, pattern recognition algorithms. The predicted qualities may help the service provider 110 to scale the open platform. For example, if the prediction indicates that a certain percentage (e.g., 10%) of codes would be submitted at a low quality, the service provider 110 may ensure that there may be sufficient computing resources to properly run that percentage of low quality code at the lowest possible cost.

In yet another example, the code quality service 114 may analyze and compare codes and associated qualities between merchants. This may allow the service provider 110 to develop best practices. For example, if two merchants have similar web site functionalities but the associated quality of code is different, the code quality service 114 may identify advantageous features of the higher quality code that may contribute to the high quality and disadvantageous features of the lower quality code that may encumber the low quality. In turn, the service provider 110 may generate documentation that may recommend to merchants wanting similar web site functionalities to include the advantageous features in code and to avoid the disadvantageous features.

Similarly, if the analysis indicates that codes from a number of merchants have a similar but low quality, the service provider 110 may determine an issue associated with the open platform. For instance, if the quality is low and the analysis indicates that the codes include instructions for calling a certain application programming interface (API) of the open platform, the service provider 110 may determine that either the API may not be properly configured and/or the documentation provided to the merchants may include a wrong version of the API.

In a further example, the code quality service 114 may track the quality of codes using various parameters and may analyze the code quality based on each of the parameters. Example parameters may include not only identifiers of merchants, but also identifiers of solution providers that the merchants may have employed for writing the codes, regions where the merchants and/or solution providers may be located, and/or other parameters. As such, based on a history of good code quality, the code quality service 114 may generate a list of preferred merchants and a list of preferred solution providers. For instance, the code quality service 114 may add a solution provider with a certain percentage (e.g., 95%) of submitted code at good quality to the list of preferred solution providers. Similarly, these lists may be broken down by regions. For example, within a certain city or region of a country, the code quality service 114 may determine a list of preferred solution providers. Being on a preferred list and/or using a solution provider from a preferred list may incentivize the merchants as discussed above.

Figure 2:
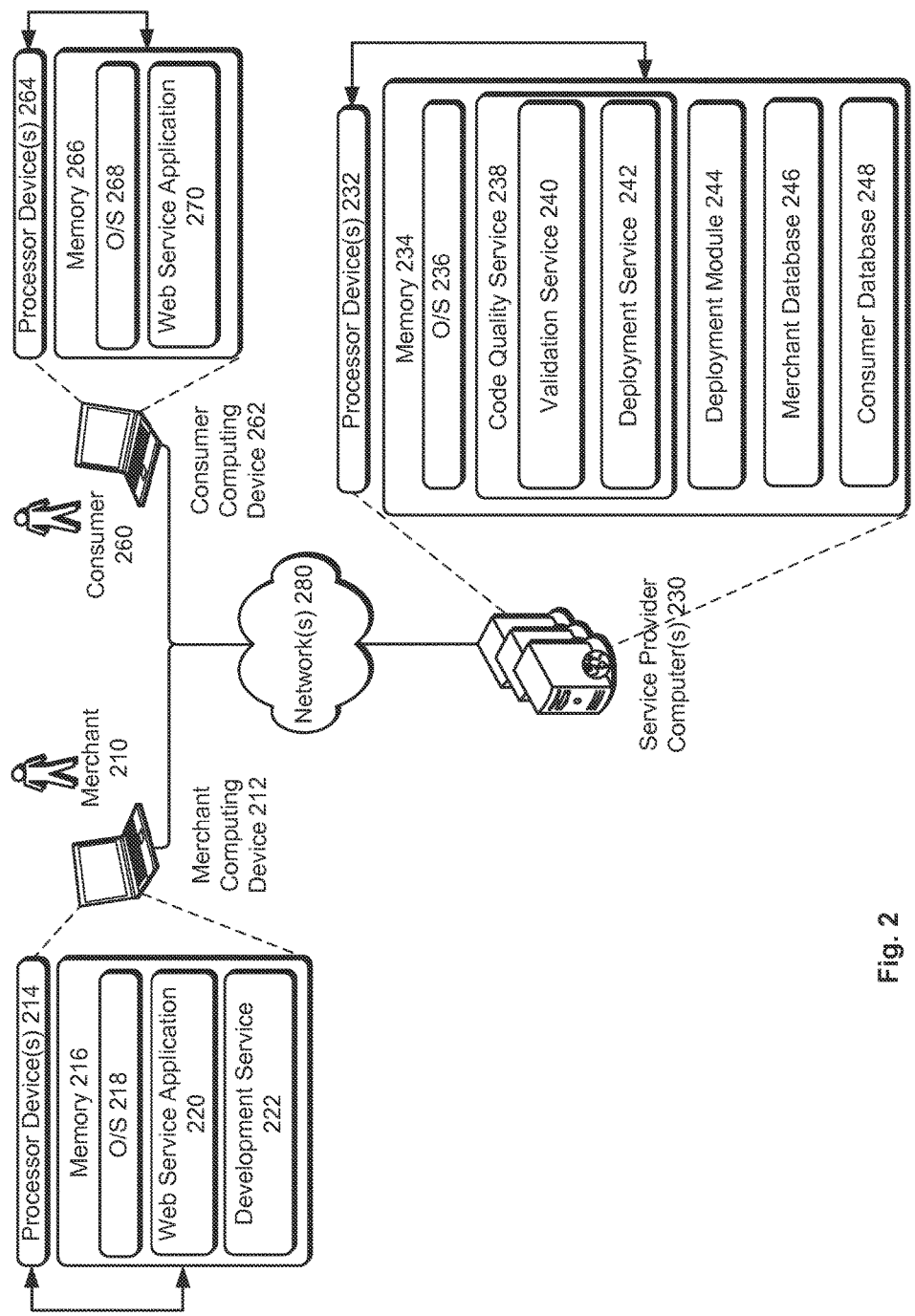
FIG. 2 illustrates an example architecture for determining and improving code quality, including at least one user device and/or one or more service provider computers connected via one or more networks, according to embodiments.

Turning to FIG. 2, that figure illustrates an example end-to-end computing environment for determining quality of codes submitted by merchants. In this example, a service provider may implement a code quality service, such as the code quality service 114 of FIG. 1, part of an open platform implemented within the context of, for example, an electronic marketplace available to users, such as the merchants 130 and the consumers 140 of FIG. 1.

In a basic configuration, a merchant 210 may utilize a merchant computing device 212 to access local applications, a web service application 220, a development service 222, a merchant account accessible through the web service application 220, a web site or any other network-based resources via one or more networks 280. In some aspects, the web service application 220, the web site, and/or the merchant account may be hosted, managed, and/or otherwise provided by one or more computing resources of the service provider, such as by utilizing one or more service provider computers 230.

The merchant 210 may use the local applications and/or the web service application 220 to interact with the network-based resources of the service provider. These transactions may include, for example, submitting codes, such as code for a web site, offering items for sale, and other information. Similarly, the merchant 210 may use the development service 222 within a framework of a SDK to develop code and assess a corresponding quality. When satisfied with the quality, the development service 222 can be used in conjuncture with the web service application 220 to submit the code to the network-based resources.

In some examples, the merchant computing device 212 may be any type of computing devices such as, but not limited to, a mobile phone, a smart phone, a personal digital assistant (PDA), a laptop computer, a thin-client device, a tablet PC, etc. In one illustrative configuration, the merchant computing device 212 may contain communications connection(s) that allow merchant computing device 212 to communicate with a stored database, another computing device or server, merchant terminals, and/or other devices on the networks 280. The merchant computing device 212 may also include input/output (I/O) device(s) and/or ports, such as for enabling connection with a keyboard, a mouse, a pen, a voice input device, a touch input device, a display, speakers, a printer, etc.

The merchant computing device 212 may also include at least one or more processing units (or processor device(s)) 214 and one memory 216. The processor device(s) 214 may be implemented as appropriate in hardware, computer-executable instructions, firmware, or combinations thereof. Computer-executable instruction or firmware implementations of the processor device(s) 214 may include computer-executable or machine-executable instructions written in any suitable programming language to perform the various functions described.

The memory 216 may store program instructions that are loadable and executable on the processor device(s) 214, as well as data generated during the execution of these programs. Depending on the configuration and type of merchant the computing device 212, the memory 216 may be volatile (such as random access memory (RAM)) and/or non-volatile (such as read-only memory (ROM), flash memory, etc.). The merchant computing device 212 may also include additional storage, which may include removable storage and/or non-removable storage. The additional storage may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 216 may include multiple different types of memory, such as static random access memory (SRAM), dynamic random access memory (DRAM), or ROM.

Turning to the contents of the memory 216 in more detail, the memory may include an operating system (O/S) 218 and the one or more application programs or services for implementing the features disclosed herein including the web service application 220 and the development service 222. In some examples, the merchant computing device 212 may be in communication with the service provider computers 230 via the networks 280, or via other network connections. The networks 280 may include any one or a combination of many different types of networks, such as cable networks, the Internet, wireless networks, cellular networks, and other private and/or public networks. While the illustrated example represents the merchant 210 accessing the web service application 220 over the networks 280, the described techniques may equally apply in instances where the merchant 210 interact with the service provider computers 230 via the merchant computing device 212 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer systems, etc.).

Similarly, a consumer 260 may utilize consumer computing device 262 to access local applications, a web service application 270, a consumer account accessible through the web service application 270, or a web site or any other network-based resources via the networks 280. In some aspects, the web service application 270, the web site, and/or the user account may be hosted, managed, and/or otherwise provided by the service provider computers 230 and may be similar to the web service application 220, the web site accessed by the computing device 212, and/or the merchant account, respectively.

The consumer 260 may use the local applications and/or the web service application 270 to conduct transactions with the network-based resources of the service provider. These transactions may include, for example, searching for items offered by the merchant 210 at the network-based resources. Similarly, the local applications and/or the web service application 270 may allow the consumer 260 to access the web site(s) of the merchant that may be hosted on the open platform.

In some examples, the consumer computing device 262 may be configured similarly to the merchant computing device 212 and may include at least one or more processing units (or processor device(s)) 264 and one memory 266. The processor device(s) 264 may be implemented as appropriate in hardware, computer-executable instructions, firmware, or combinations thereof similarly to the processor device(s) 214. Likewise, the memory 266 may also be configured similarly to the memory 216 and may store program instructions that are loadable and executable on the processor device(s) 264, as well as data generated during the execution of these programs. For example, the memory 266 may include an operating system (O/S) 268 and the one or more application programs or services for implementing the features disclosed herein including the web service application 270.

As described briefly above, the web service applications 220 and 270 may allow the merchant 210 and consumer 260, respectively, to interact with the service provider computers 230 to conduct transactions involving items. The service provider computers 230, perhaps arranged in a cluster of servers or as a server farm, may host the web service applications 220 and 270. These servers may be configured to host a web site (or combination of web sites) viewable via the computing device 212 and 262. Other server architectures may also be used to host the web service applications 220 and 270. The web service applications 220 and 270 may be capable of handling requests from many merchant 210 and consumer 260, respectively, and serving, in response, various interfaces that can be rendered at the computing device 212 and 262 such as, but not limited to, a web site. The web service applications 220 and 270 can interact with any type of web site that supports interaction, including social networking sites, electronic retailers, informational sites, blog sites, search engine sites, news and entertainment sites, and so forth. As discussed above, the described techniques can similarly be implemented outside of the web service applications 220 and 270, such as with other applications running on the computing device 212 and 262, respectively.

The service provider computers 230 may, in some examples, provide network-based resources such as, but not limited to, applications for purchase and/or download, web sites, web hosting, client entities, data storage, data access, management, virtualization, etc. The service provider computers 230 may also be operable to provide web hosting, computer application development, and/or implementation platforms, or combinations of the foregoing to the merchant 210 and consumer 260.

The service provider computers 230 may be any type of computing device such as, but not limited to, a mobile phone, a smart phone, a personal digital assistant (PDA), a laptop computer, a desktop computer, a server computer, a thin-client device, a tablet PC, etc. The service provider computers 230 may also contain communications connection(s) that allow service provider computers 230 to communicate with a stored database, other computing devices or server, merchant terminals, and/or other devices on the network 280. The service provider computers 230 may also include input/output (I/O) device(s) and/or ports, such as for enabling connection with a keyboard, a mouse, a pen, a voice input device, a touch input device, a display, speakers, a printer, etc.

Additionally, in some embodiments, the service provider computers 230 may be executed by one more virtual machines implemented in a hosted computing environment. The hosted computing environment may include one or more rapidly provisioned and released network-based resources, which network-based resources may include computing, networking, and/or storage devices. A hosted computing environment may also be referred to as a cloud computing environment. In some examples, the service provider computers 230 may be in communication with the computing device 212 and 262 via the networks 280, or via other network connections. The service provider computers 230 may include one or more servers, perhaps arranged in a cluster, or as individual servers not associated with one another.

In one illustrative configuration, the service provider computers 230 may include at least one or more processing units (or processor devices(s)) 232 and one memory 234. The processor device(s) 232 may be implemented as appropriate in hardware, computer-executable instructions, firmware, or combinations thereof. Computer-executable instruction or firmware implementations of the processor device(s) 232 may include computer-executable or machine-executable instructions written in any suitable programming language to perform the various functions described.

The memory 234 may store program instructions that are loadable and executable on the processor device(s) 232, as well as data generated during the execution of these programs. Depending on the configuration and type of the service provider computers 230, the memory 234 may be volatile (such as random access memory (RAM)) and/or non-volatile (such as read-only memory (ROM), flash memory, etc.). The service provider computers 230 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 234 may include multiple different types of memory, such as static random access memory (SRAM), dynamic random access memory (DRAM), or ROM.

Additionally, the computer storage media described herein may include computer-readable communication media such as computer-readable instructions, program modules, or other data transmitted within a data signal, such as a carrier wave, or other transmission. Such a transmitted signal may take any of a variety of forms including, but not limited to, electromagnetic, optical, or any combination thereof. However, as used herein, computer-readable media does not include computer-readable communication media.

Turning to the contents of the memory 234 in more detail, the memory may include an operating system (O/S) 236, a code quality service 238, a deployment module 244, a merchant database 246, and a consumer database 248. The code quality service 238 may be similar to the code quality service 114 of FIG. 1 and may implement a service for evaluating qualities of code submitted by the merchant 210 and to provide recommendation for code changes. In particular, the code quality service 238 may include a validation service 240 and a deployment service 242 similar to the validation service 114A and deployment service 114B of FIG. 1, respectively. The validation service 240 may be used during a validation phased of the code and may result in a validation quality. Similarly, the deployment service 242 may be used after deployment of the code and may result in an operation quality. The deployment model 244 may interface with the code quality service 238 to retrieve the code quality and, accordingly, identify and deploy or redeploy the code to a proper computing resource of the service provider. The merchant database 246 may store information about the merchant 210, including codes, a history of submitted codes, and the associated qualities, and similar information about other merchants. The consumer database 248 may store information about the consumer 260, including a history of requests made for the web site of the merchant 210 and for other web sites. Although FIG. 2 illustrates the databases 246 and 248 as stored in the memory 234, these databases or information from these databases may be additionally or alternatively stored at a storage device remotely accessible to the service provider computers 230. Configurations and operations of the code quality service 228 are further described in greater detail below with reference to at least FIGS. 3-7.

Figure 3:
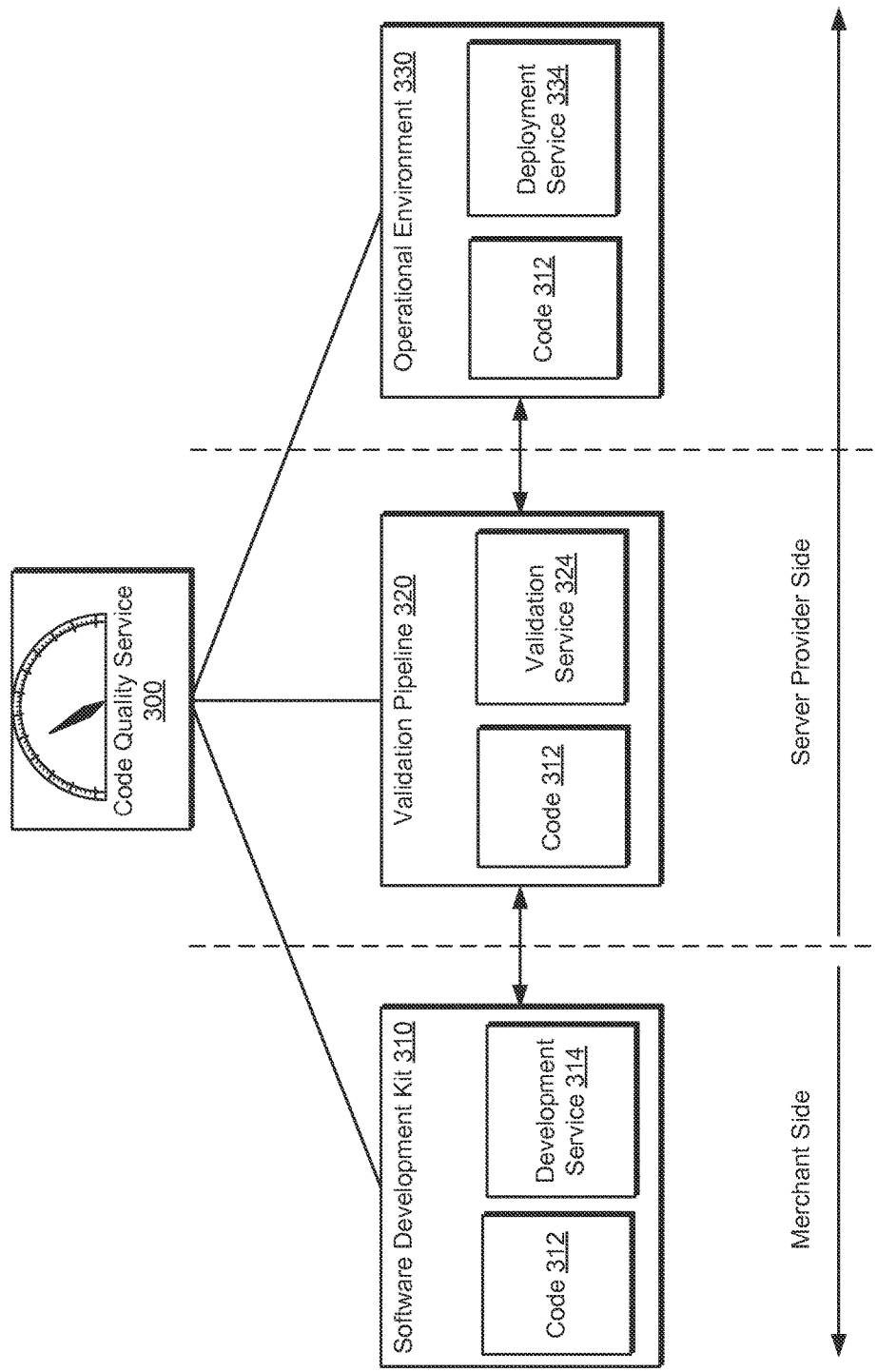
FIG. 3 example phases for developing, validating, and deploying code, according to embodiments.

Turning to FIG. 3, that figure illustrates an example diagram for phases that code may go through and how a quality of the code may be assessed in each phase. More particularly, a code 312 developed by a merchant may traverse from a merchant side to a service provider side. At the merchant side, the merchant may initially develop the code 312 locally by, for example, writing and testing the code in a local computing environment of the merchant. At the service provider side, the merchant may submit the code 312 to the service provider that, in turn, may validate and deploy the code on a computing resource of an open platform of the service provider. There may be interactions between the two sides. For example, after receiving the code, the service provider may provide feedback and incentives to the merchant for modifying the code to improve the quality.

At the merchant side, the merchant may operate a computing device to utilize a software development kit 310 within an integrated development environment (IDE) for developing the code. The SDK 310 may allow the merchant to use a combination of tools to write, compile, and debug the code 312, such as an editor, a compiler, a debugger, a browser, and/or other tools. Similarly, the SDK 310 may include a tool that may implement a development service 314, similar to the development service 134A of FIG. 1. More particularly, the development service 314 may evaluate the development quality of the code 312, recommend code changes to improve the development quality, and allow the merchant to submit the code 312 at a certain development quality.

To do so, the development service 314 may analyze the code against a checklist. The checklist may include a set of rules for analyzing the code by applying various criteria that may also defined in the checklist. The checklist may also include a formula for generating a score representative of the code quality. This formula may use weights associated with the criteria to properly emphasize certain criteria over others. Further, the checklist may allow the development service 314 to derive a grade from the score, such that a quantitative and/or a qualitative indication of the code quality can be achieved. For example, the checklist may set the score as the grade. In another example, the checklist may compare the score to a threshold(s) and may set the grade based on the comparison. For example, for a score that exceeds the highest threshold, the development service 314 may determine that the grade is the highest possible grade (e.g., an "A," a "100," or an "excellent quality"). Similarly, for a score that fails the lowest threshold, the development service 314 may determine that the grade is the lowest possible grade (e.g., an "F," a "0," or a "poor quality").

For illustrative purposes, consider two criteria: memory utilization and code coverage. The associated weights may be 0.75 and 0.25, respectively, on a scale of 1 (or some other numbers and scale) reflecting that memory utilization may be a more important criteria for code quality. The set of rules may specify that a memory utilization that exceeds a certain amount should get a score of "0" and, otherwise, a "100." In comparison, the set of rule may also specify that code coverage over a certain percentage should get a score of "100" and, otherwise, a "0." The formula may combine the two weighted scores to generate a total score. If the total score exceeds a certain threshold (e.g., 90 or some other amount), the grade may be an "excellent quality." But if the score falls between two thresholds (e.g., 60 and 89 or some other amounts), the grade may be an "acceptable quality." Otherwise, the grade may be a "poor quality." As such, if the code 312 results in proper memory utilization and uses proper code coverage, the score would be 0.75×100+0.25× 100=100 and the grade would be an excellent quality. If the code 312 results in proper memory utilization but uses proper code coverage, the score would 0.75×100+0.25× 0=75 and the grade would be an acceptable quality. However, if the code 312 results in poor memory utilization, the grade would be a poor quality because regardless of whether the code 312 uses proper code coverage or not, the score can no longer exceed 25.

The above example is illustrative only. The checklist may define other criteria, rules, weights, thresholds, and formulas. More particularly, in the development environment within the merchant side, the checklist may allow the development service 314 to consider the following: a semantic check, a syntactic check, a code coverage measure, an application programming interface (API) version, a number of API calls, a code complexity measure, a size of data associated with API calls, a latency measure, simulated operational metrics (e.g., CPU utilizations, memory utilization, latencies), and/or emulated operational metrics. These criteria may be grouped in tiers, each of which may be associated with a weight. For example, a top tier may include the operational metrics and may have the largest weight. A middle tier may include the API version, the number of API calls, and the size of data associated with API calls and may have a medium weight. The remaining criteria may belong to a low tier that may have the lowest weight.

Further, the uses of the checklist may vary depending on the implementation. For example, the deployment service 314 may use the same checklist regardless of the quality of the code 312. In another example, the checklist may vary based on a desired code quality. As further explained in FIG. 5, the merchant may operate the development service 314 to set a target level for the code 312. Based on this level, the checklist may change such that the higher the level may be, the more stringent the checklist may become. For instance, the higher the level may be, the more criteria should be considered. This may reflect that, for the code 312 to receive higher grades, the code 312 should result in better performance. As such, at the highest target level, the checklist may include all of the above criteria, each of which may be equally weighted. In comparison, at the lowest target level, the checklist may include a minimum number of criteria such as the ones from the low tier. In between, the checklist may include various combinations of the criteria with different weights including, all of the criteria from the three tiers, the low and medium tiers, the low and high tiers, the medium and high tiers, the medium tier, the high tier and/or other combinations of criteria weighed using the associated tier weights.

In addition to using a checklist to determine the quality of the code 312, the development service 314 may inform the merchant of the quality. For example, the development service 314 may display, by way of a user interface, the grade of the code 312 on the computing device operated by the merchant. Further, the development service 314 may display at this or another interface, a recommendation for code changes that may improve the development quality. The recommendation may include a description of the changes and the projected improvement in the development quality. To do so, the development service 314 may analyze how each portion of the code 312 meets or fails certain considered criteria based on corresponding rules. The development service 314 may flag a portion of the code that may fail a specific criterion as a candidate for change and may assess how changing this portion to meet the criterion may improve the development quality.

To illustrate, the code 312 may include a portion that calls a deprecated version of an API. If the checklist considers API versions in evaluating the development quality, using the deprecated version may lower the development quality. As such, by applying the checklist, the development service 314 may determine that the code 312 may use the deprecated API version. The development service 314 may also re-apply the checklist to a copy of the code 312 that uses the proper API version to determine what development quality may result. Based on this analysis, the development service 314 may notify the merchant of the use of the deprecated API version, identify the proper API version, and describe the impact to the development quality if the code 312 is updated to use the proper API version.

Once the merchant completes development of the code 312, the merchant may submit the code 312 to the service provider. For example, the SDK 310 may allow an interface with a version control system implemented at a validation pipeline 320. The version control system may facilitate a user interface usable by the merchant to check-in the code 312 in the validation pipeline 320 and to indicate the development quality.

Once received, the code 312 may be validated in the validation pipeline 320 before deployment. This validation may include implementing a validation service 324, similar to the validation service 114A of FIG. 1. The validation service 324 may assess a validation quality of the code 312, may recommend code changes to the merchant and the service provider, and may identify configurations of a computing resource to which the code 312 may be deployed.

More particularly, the validation service 324 may use similar checklist as that of the development service 314. For example, the used checklist may specify rules, criteria, weights, thresholds, formulas, scores, and grades. In addition, as in the case of the development service 314, uses of the checklist may vary depending on the implementation. For example, the validation service 324 may use a same checklist regardless of the development quality of the code 312 as submitted by the merchant. In other words, in this example, the validation service 324 may determine a validation quality by using the checklist independently of the development quality. In this way, the validation service 324 can generate the validation quality irrespectively of the development quality and may compare both qualities. If there are discrepancies between the qualities, the validation service 324 may flag the discrepancies and perform a further analysis. For instance, the validation service 324 may request and receive from the development service 314 a construct of the development quality and may compare this construct to a construct of the validation quality. Inconsistencies between the two constructs may indicate that the development service 314 and/or the validation service may not be using the same framework or set of parameters to determine the respective code qualities. This may allow the service provider to further fine tune both services for consistency as needed.

In another example, the checklist may change based on a number parameters. A first parameter may include the development quality. For example, the validation service 324 may set the development quality as a to-be validated quality level. Based on this level, a customized checklist may be applied (e.g., the higher the level may be, the more stringent the checklist may become) to determine a validation quality accordingly. If the resulting validation quality meets the to-be validated quality level, the validation service 324 may set the validation quality to that level. But, if the validation quality exceeds the to-be validated level, the validation service 324 may increase the to-be validated quality level. Otherwise, the validation service 324 may decrease the to-be validated quality level. This process may be iteratively repeated until the resulting validation quality meets the to-be validated quality level.

Even if no development quality was submitted with the code 312, the validation service 324 may implement this iterative process. For instance, the validation service 324 may employ a binary search algorithm that may divide the analysis over the number of possible levels (N) by that number (N) and may start the analysis in the middle level (e.g., a level corresponding to N/2). This may permit in a quicker analysis to determine the validation code in comparison to an exhaustive analysis. If the resulting validation quality exceeds this level, the validation service 324 may move to the next top middle (e.g., a level corresponding to 3N/4). Otherwise, the validation service 324 may move to the next bottom middle (e.g., a level corresponding to N/4). This process may be repeated until the validation service 324 may determine a validation code that meets an analyzed level.

A second parameter may include an identifier of the merchant. For example, if the merchant belongs to a preferred list, the validation service 324 may revise the checklist to include certain criteria only. For example, instead of using all of the criteria, the validation service 324 may only apply the top tier criteria. In this way, the analysis may be quicker which may allow a faster deployment of the code.

A third parameter may consider whether the code 312 includes re-submitted portions. For example, based on a previous analysis, the validation service 324 may have recommended changes to the code 312. Accordingly, the merchant may have re-submitted the code 312 with the changes. In this case, the validation service 324 may analyze only the modified portions through the checklist. This may also allow a quicker validation of the code. Of course, combination of the above and other parameters may be used. For example, if the code is re-submitted and the merchant is on the preferred list, the validation service 324 may analyze only the modified portions. Otherwise, the validation service 324 may analyze the entire core 312.

In addition to assessing a validation quality, the validation service 324 may recommend code changes. This recommendation can be similar to the recommendation of the development service 314. For example, the validation service 324 may analyze how each portion the code 312 meets or fails considered criteria based on corresponding rules and may notify the merchant and the service provider accordingly. This may allow the merchant the opportunity to re-submit and the service provider to receive the code 312 at a higher quality before deployment. Further, the validation service 324 may monitor recommended changes provided to the merchant and/or to other merchants. This may allow the service provider to, overtime and across merchants, develop best practices, identify issues with the open platform, and/or update the validation service 324 (e.g., the checklist).

Furthermore, the validation service 324 may identify configurations of a computing resource to which the code 312 may be deployed. In general, the service provider may desire to run the code as cheaply as possible. In other words lower quality code should be run on less expensive machines (e.g., actual physical computing resource and/or a virtual machine) and higher quality code should be run on more expensive machines. As such, the validation service 324 may identify the configuration best fitted to reduce the cost (a security level of the machine, a processing power, a memory size, a priority level for executing the code, and a routing requirement on a network of the open platform such as a not-to-exceed number of hops on the network to reach the machine). This may involve the validation service 324 storing and/or accessing a table that correlates configurations and code qualities. For example, for possible qualities of code, the table may list acceptable configurations. The validation service 324 may use the validation quality to retrieve an acceptable configuration from the table.

Once the code 312 has been validated, the validation quality communicated to the merchant and the service provider, and authorization is received to deploy the code 312, the code 312 may move from the validation pipe 320 to an operation environment 330. In this operation environment 330, the code may be hosted on a machine (e.g., actual physical computing resource and/or a virtual machine) that may be configured based on the identified configuration. For example, in response to a consumer requesting access to a web site implemented by the code 312, the operational environment 330 may launch a virtual machine and/or an instance within a virtual machine based on the identified configuration.

The operation environment 330 may also include a deployment service 334 that may determine an operational quality of the code 312 as deployed. More particularly, the deployment service 334 may use similar checklist as that of the validation service 324. For example, the used checklist may specify rules, criteria, weights, thresholds, formulas, scores, and grades. However, in the operational environment 330, operational metrics may be the most valuable criteria. In other words, these metrics may be weighted the highest. As such, the used checklist may mainly consider: CPU usage, memory usage, input/output calls, network calls, latencies, and/or other operational metrics associated with the machine hosting the code.

In addition, as in the case of the validation service 324, uses of the checklist may vary depending on the implementation. For example, the deployment service 334 may use a same checklist regardless of the validation quality of the code 312. In other words, in this example, the deployment service 334 may determine an operational quality by using the checklist independently of the validation quality. This may allow the deployment service 334 to determine discrepancies between the validation quality and the operational quality and, in turn, the service provider to further fine tune both services for consistency as needed.

In another example, the checklist may change based on a number parameters, including the validation quality, the identifier of the merchant, and/or whether the code 312 may include recommended modifications to a code previously submitted. Similar to the case of the validation service 324, here the checklist may vary such that the validation quality may be an input to the checklist that may set a target level against which the operational quality should be measured. Likewise, the considered criteria, weights, and/or rules may also vary based on any or a combination of the parameters.

In addition to assessing an operational quality, the deployment service 334 may recommend code changes. This recommendation can be similar to the recommendation of the validation service 324. For example, the deployment service 334 may analyze how each portion the code 312 meets or fails considered criteria based on corresponding rules and may notify the merchant and the service provider accordingly. This may allow the merchant the opportunity to re-submit and the service provider to receive the code 312 at a higher quality even after deployment. Further, the deployment service 334 may monitor recommended changes provided to the merchant and/or to other merchants. This may allow the service provider to, overtime and across merchants, develop best practices, identify issues with the open platform, and/or update the deployment service 334 (e.g., the checklist). In addition, the deployment service 334 may identify another configuration and/or another machine (e.g., a physical computing resource and/or a virtual machine) for hosting the code in a more cost-efficient manner. For example, the deployment service 334 may store a table and/or access a table that correlates configurations and code qualities. The deployment service 334 may query this table with the operational code to determine an acceptable configuration.

As is further illustrated in FIG. 3, the development, validation, and deployment services 314, 324, and 334 may be components of or may interface with a code quality service 300. The code quality service 300 may manage the three services including, for example, updating any of the services. For example, based on the monitoring of code qualities and recommended changes over time and across multiple merchants, updates to the checklists may be identified e.g., what criteria, rules, weights should apply at each phase-development, validation, and deployment/operation). For instance, if code complexity becomes a more pronounced issue over time, the checklist may be updated to accord higher weight to this criterion. Similarly, if discrepancies are detected between the services, updates to the checklists can be used to synchronize the way the services evaluate the code quality. The code quality service 300 may push these and other updates to the development, validation, and deployment services 314, 324, and 334 as needed. Additionally, the code quality service 300 may store the latest versions of the checklists. As such, instead of or along with locally storing checklists, each of the services can request and receive from code quality service 300 the latest versions as needed.

Hence, by implementing the code quality service 300 and the development, validation, and deployment services 314, 324, and 334, a service provider may enable a merchant to submit higher code quality throughout the development, validation, and deployment/operation phases of the code. In addition to gaining knowledge of the code quality before and after deployment, the merchant may also benefit from recommended changes that may improve the code quality. Likewise, the service provider can anticipate or expect code qualities across multiple merchants, scale the open platform accordingly, and develop proper documentations, configurations, preferred lists, and/or other tools relevant to using the open platform.

Figure 4:
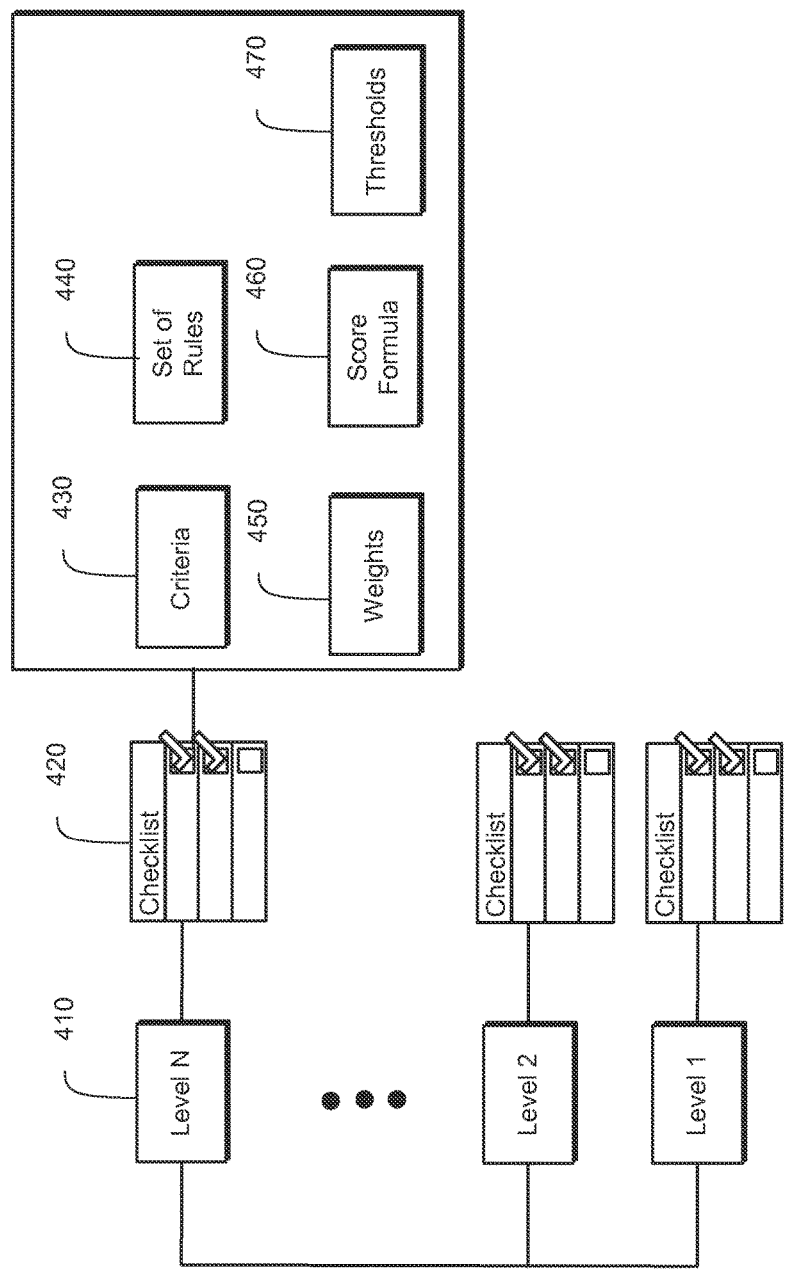
FIG. 4 illustrates an example checklist for evaluating code quality, according to embodiments.

Turning to FIG. 4, that figure illustrates an example checklist that can be used by a development service, a validation service, and/or a deployment service. As explained herein above, the checklist may vary based on a phase in which the code may be evaluated. In other words, the deployment service may use a different checklist than that of the validation service and/or the development service. Similarly, the validation service may use a different checklist than that of the development service. Further, within each phase, the checklist may vary based on a number of parameters including, for example, an identifier of a merchant associated with the code, and/or an identification of whether the code may implement a recommended modification to a previously submitted code.

In addition, and as illustrated in FIG. 4, the example checklist may vary based on an inputted quality level. For example, in the development phase, if the merchant sets a target level for quality of the code, that target level may be used. Similarly, in the validation phase, if the code is received with a development quality, that development quality may be used. Likewise, in the deployment/operation phase, if the code is received with a validation quality, that validation quality may be used. The higher the quality level may be, the more stringent or inclusive the checklist may become. In other words, the checklist may include more criteria that should be checked for higher quality levels of code. If a quality level was not inputted (e.g., the merchant has not set a target level and/or the validation service did not receive the development quality), a default checklist may be applied. This default checklist may consider all available criteria and rules.

As such, there may be multiple levels (N) 410 of potential code quality (e.g., "1" to "10," "F" to "A," or some other partitioning). With each level, a checklist 420 may be associated. Each of the checklists may include criteria, rules, weights, formulas, and thresholds that can be used in conjunction to determine a code quality. These can be pre-configured by a service provider and can be updated over time based on actual metrics associated with uses of the checklists. For example, based on the monitoring of the code qualities across multiple merchants, a code quality service may update any or all of the components of the checklists.

As illustrated, the checklist 420 may contain criteria 430, set of rules 440, weights 450, score formula 460, and thresholds 470. The criteria 430 may specify the various metrics and/or features that should be checked when evaluating the code (e.g., versions of the APIs and other criteria). The set of rules 440 may include rules associated with the criteria, where each rule may specify a value and/or a meaning of the code for meeting or failing an associated criterion (e.g., if improper API versions are used, a rule associated with this criterion may specify that a score of "0" should be used). The weights 450 may be also associated with the criteria 430 and the set of rules 440, where each weight may be a multiplier of a value specified by the rule. The weights 450 may allow emphasizing values of some criteria over other criteria. The score formula 460 may include a formula that may generate a score based on a checking the code against the criteria 430 based on the rules 440 and the weights 450. For example, when the code may meet a criterion, the corresponding value specified by the set of rules 440 may be weighed based on the weights 450 and added to the score. The thresholds 470 may define ranges that may map the score from the score formula 460 to a quality and/or quality grade. For example, if the score is higher than the highest threshold, the quality of the code may be the highest. Similarly, if the score is lower than the lowest thresholds, the quality of the code may be the lowest.

Hence, the checklist 420 may allow a code to be checked against a set of criteria based on a set of rules and weights such that a quality grade may be generated using a scoring formula. Further, the checklist 420 may be configured, customized, and/or updated based on various parameters. This may afford flexibility to a service provider in applying the checklist 420 to evaluate code qualities. Configurations and operations of the checklist 420 and the deployment, validation, and services are further described in greater detail below with reference to at least FIGS. 5-7.

Figure 5:
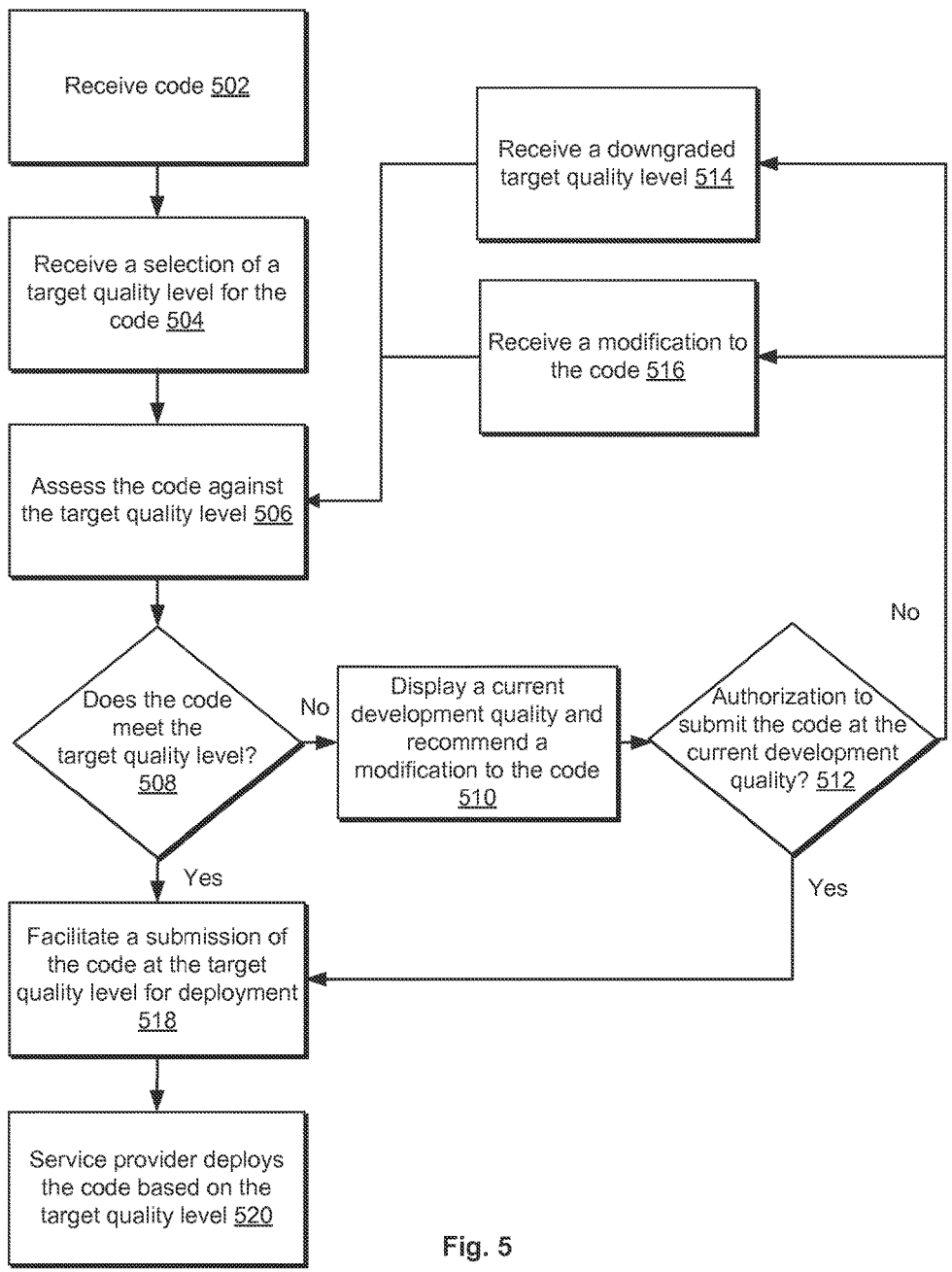
FIG. 5 illustrates an example flow for evaluating code quality in a development phase, according to embodiments.
Figure 6:
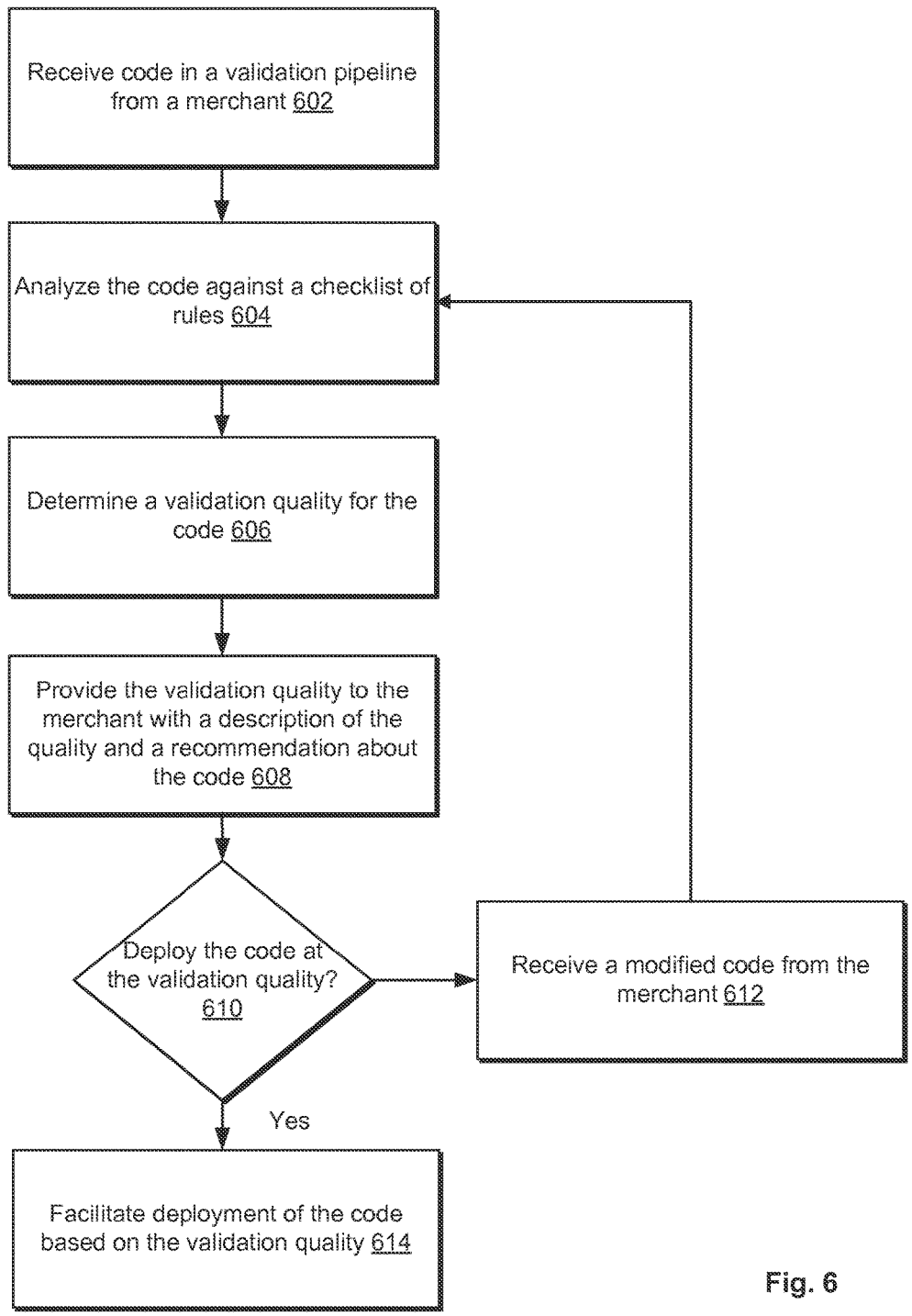
FIG. 6 illustrates an example flow for evaluating code quality in a validation phase, according to embodiments.
Figure 7:
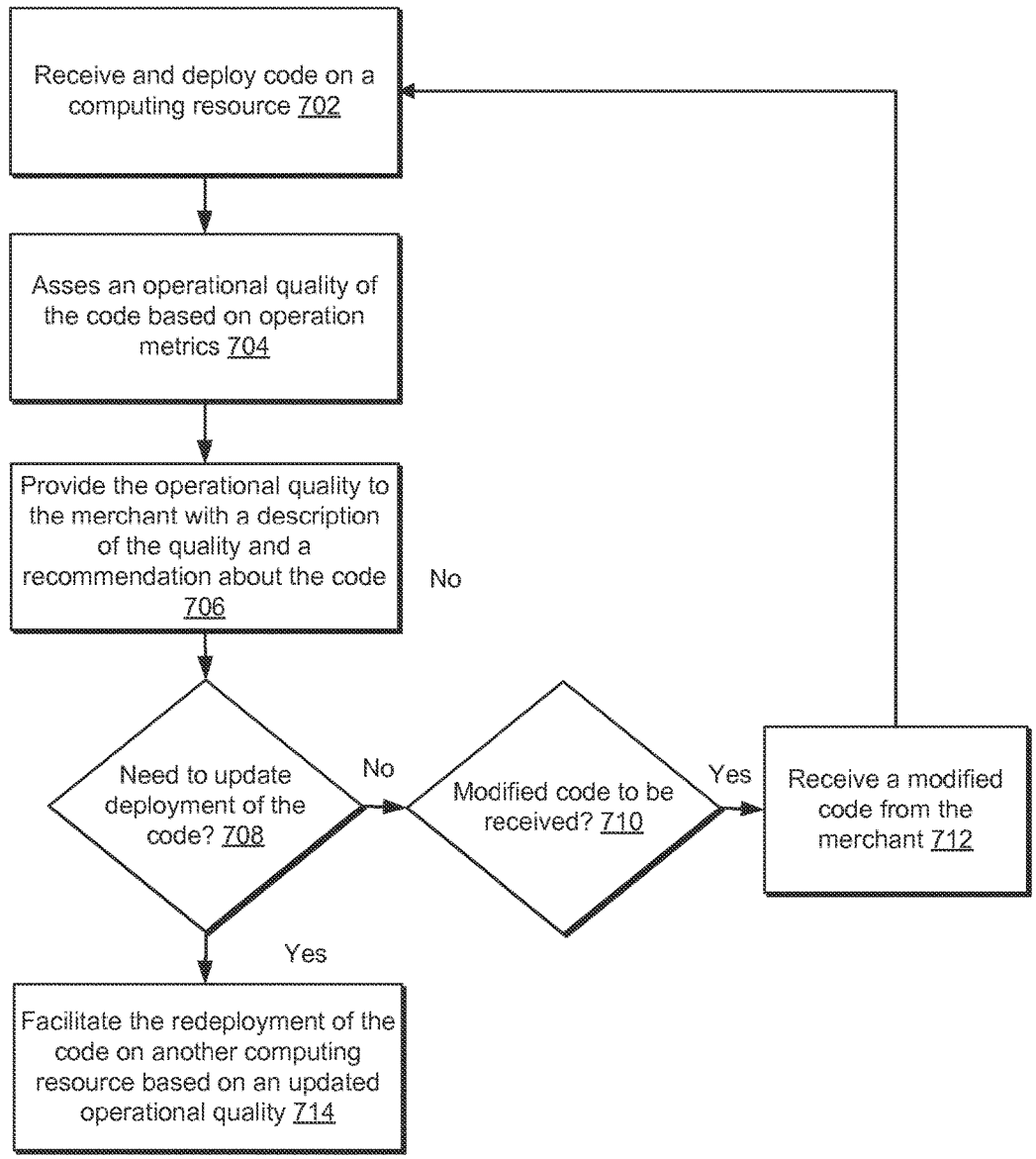
FIG. 7 illustrates an example flow for evaluating code quality in a deployment phase, according to embodiments.

FIGS. 5-7 illustrate example flows that can be implemented for evaluating code quality as described above in FIGS. 1-4. In the interest of clarity of explanation, a code quality service, such as code quality service 114, 238, or 300 of FIGS. 1, 2, and 3, respectively, is described in FIGS. 5-7 as performing the flows. However, various components of the code quality service may be configured some or all of the operations. For example, a development service may be configured to perform the operations of the example flow of FIG. 5. Similarly, a validation service may be configured to perform the operations of the example flow of FIG. 6. Likewise, a deployment service may be configured to perform the operations of the example flow of FIG. 7. Additionally, other components within a computing system, such as components of the merchant computing device 212 and/or of the server provider computers 230 of FIG. 2, can be used and should be apparent to those skilled in the art.

Further, the example flows of FIGS. 5-7 may be embodied in, and fully or partially automated by, code modules executed by one or more processor devices of the computing system. The code modules may be stored on any type of non-transitory computer-readable medium or computer storage device, such as hard drives, solid state memory, optical disc and/or other non-transitory medium. The results of the operations may be stored, persistently or otherwise, in any type of non-transitory computer storage such as, e.g., volatile or non-volatile storage. Also, while the flows are illustrated in a particular order, it should be understood that no particular order is necessary and that one or more operations or parts of the flows may be omitted, skipped, and/or reordered.

FIG. 5 illustrates an example flow that the code quality service may implement for determining a quality of a code during a development phase of the code. In comparison, FIG. 6 illustrates an example flow that the code quality service may implement for determining the quality in a validation phased, after the code may have been developed but before the code may have been deployed. FIG. 7 illustrates an example flow that the code quality service may implement for determining the quality in deployment phase, such as when the code may be put to operation. Some operations may be similar between the flows. In interest of clarity of explanation, such similarities may not be repeated. Further, the three flows can be used separately or in conjunction such that an output from one flow may be inputted in another flow and feedback from the other flow may be provided to the initial flow.

Turning to FIG. 5, the example flow may be executed by a code quality service to allow a merchant to develop a code with a target quality level. During development, the flow, as executed, may allow the merchant to assess how the development quality compares to the target quality level. When that target is met, the flow, as executed, may allow the merchant to submit the code to a service provider.

The flow may start at operation 502, where the code quality service may receive the code. For example, the code quality service may be implemented within a SDK that the merchant may use to write and test the code. In this example, the code quality service may be standalone tool within the SDK and may receive the code from, for example, an editor in the SDK. In another example, the code quality service may be integrated with other tools within the SDK, such the editor, a compiler, and/or a debugger.

At operation 504, the code quality service may receive a selection of the target quality level for the code. For example, the code quality service may support a user interface displayed to the merchant, where the user interface may allow the merchant to select the target quality level from a drop-down menu. Based on this selection, the code quality service may determine what quality the merchant may plan to desire to have for the code.

At operation 506, the code quality service may assess the code against the target quality level. For example, the code quality service may determine, based on the target quality level, an applicable checklist and may compare the code to the checklist. This checklist may allow the code quality service to generate a quality grade or a development quality based on various criteria, rules, weights, and formulas. Also, at this operation, if no target quality level was received, the code quality service may use a default checklist to generate the development quality and may set this development quality as the target quality level. In this case, if the merchant is not satisfied with the development quality, then operation 504 may be performed again to receive a selection of the merchant for another target quality level.

At operation 508, the code quality service may determine whether the development quality meets or exceeds the target quality level by, for example, comparing the development quality to the target quality level. If so, the code quality service may determine that the quality of the code may meet the target of the merchant and may proceed with operation 518 to facilitate the submission of the code. Otherwise, the code quality service may determine that the quality does not meet the target and may proceed with operations 510.

At operation 510, the code quality service may display the current development quality and a recommendation for a code change that may improve the quality. For example, the code quality service may display this information at the user interface. To provide the recommendation, the code quality service may determine, for example, what features of the code fail the applied criteria from the checklist and may determine the impact to the code quality if these criteria were met. Based on this analysis, the code quality service may display at the user interface information about code changes to meet the criteria and the associated code quality improvements.

At operation 512, the code quality service may determine whether an authorization for submitting the code at the current development quality is received. For example, in conjunction with displaying the current development level and the recommendation for the code changes to the merchant, the code quality service may also allow an option to submit the code as is at the user interface. If such an option is selected, the code quality service may determine that the authorization is received and may proceed with operation 518 to facilitate the code submission. Otherwise, the code quality service may proceed with operation 514 or 516 to further assess the quality of the code. Operations 514 and 516 may be performed independently of each other, in conjunction, in series, or in parallel.

At operation 514, the code quality service may receive a downgraded target quality level. For example, the merchant may select at the user interface a lower target quality level than the initial level. The code quality service may receive this selection and proceed with operation 506 to determine whether the code has a quality that meets this downgraded level.

At operation 516, the code quality service may receive a modification to the code. For example, the code quality service may receive and compare a new code to the current code to determine the modification. In another example, the code quality service may receive from another tool of the SDK information about the modification. If the modification implements the recommended changes, the code quality service may determine that the development quality of the code, as modified, may be higher as indicated in the recommendation. Additionally or alternatively, the code quality service may proceed with operation 506 to assess the new development quality. In this case, the assessment can be based on the entire code or on only the modification.

At operation 518, the code quality service may facilitate the submission of the code at the target quality level for submission. At this point in the operation, the code quality service may have determined that the development quality meets or exceeds the target quality level and may proceed with supporting the submission. As such, the code quality service may display at the user interface a selectable option for submitting the code. Based on the merchant's selection of this option, the code quality service may support a transmission of the code to a computing device of a service provider.

At operation 520, the service provider may operate a service for deploying the code based on the target quality level. For example, the computing device that may receive the code may be within a validation pipeline of the service provider, where the validation service may implement a validation service that may further validate the development quality of the code and identify a configuration of a computing machine for hosting the code.

Turning to FIG. 6, the example flow may be executed by a code quality service to allow a service provider to validate a quality of code submitted by a merchant within the context of a validation process or pipeline. During the validation, the flow, as executed, may allow the service provider to assess the validation quality, provide feedback to the merchant, and identify a configuration of a computing machine for hosting the code.

The flow may start at operation 602, where the code quality service may receive the code in the validation pipeline. For example, the code quality service may be integrated with tools in the validation pipeline configured to validate the code. When the code is received in the validation pipeline, the code quality service may proceed with determining a validation quality of the code.

At operation 604, the code quality service may analyze the code against a checklist. The checklist may allow the code quality service to generate the validation quality based on various criteria, rules, weights, and formulas. If information about a development quality of the code is available, the code quality service may customize and/or update the checklist based on this information and may analyze the code against this checklist. Otherwise, the code quality service may apply a default checklist.

At operation 606, the code quality service may determine the validation quality of the code. As explained herein above, the validation quality may be an output of analyzing the code against the checklist. For example, this validation quality may be set as a quality grade that the analysis may output.

At operation 608, the code quality service may provide information about the validation quality to the merchant with a description of the quality and a recommendation about the code. For example, the code quality service may notify the merchant by way of an electronic communication (e.g., an email sent to an email address of the merchant) and/or by way of a user interface accessible to the merchant. The description of quality may include information about what the validation quality may mean, how this quality was assessed, and potential costs associated with deploying the code at this quality. The recommendation may include recommended code changes that may improve the code quality. Similar information may also be provided to the service provider and/or may be stored by the code quality service.

At operation 610, the code quality service may determine whether an authorization to deploy the code at the validation quality is received. For example, the code quality service can support a user interface usable by the service merchant and/or the service provider to input such authorization. In another example, this operation may be automated by assuming that the authorization is received by default, unless otherwise indicated by the merchant and/or the service provider. If the authorization is received, the code quality service may proceed with operation 614 to facilitate deployment of the code. Otherwise, the code quality service may proceed with operation 612, where a modification to the code may be received.

At operation 612, the code quality service may receive the modification to the code. This modification may be initiated by the merchant or, if authorized, by the service provider. In an example, the code quality service may receive a modified code and may compare the code to the modified code to determine the modification. In another example, the code quality service may receive only the modification and/or information about the modification. This operation may be followed by operation 604. However, in this case, and depending on various parameters such as whether the merchant is on a preferred list or not, the code quality service may re-assess the validation quality of the modified code by analyzing the modified code or by analyzing only the modification or the information thereof. Further, if the modification is in line with the recommended code changes, the code quality service may not re-assess the validation quality. Instead, the code quality service may assume that the validation quality may be at a higher level as indicated in the recommendation.

At operation 614, the code quality service may facilitate the deployment of the code based on the validation quality. At this point in the flow, the code quality service may have received the authorization to proceed with the deployment. As such, and for example, the code quality service may determine an acceptable configuration of a computing machine that may properly host the code at an acceptable cost. This determination may be made by querying a table that correlates between configurations and validation qualities. Once determined, the code quality service may identify the configuration, and may provide this identification along with the code quality and the code as needed to a deployment module configured to deploy the code on an open platform of the service provider.

Turning to FIG. 7, the example flow may be executed by a code quality service to allow a service provider to determine a quality of code submitted by a merchant when the code is in operation on an open platform of the service provider. The flow, as executed, may allow the service provider to assess an operational quality, provide feedback to the merchant, and identify a configuration of another computing machine that may host the code at a lower cost.

The flow may start at operation 702, where the code may be received and deployed on a computing resource of the open platform. For example, the open platform may include a deployment module that deploys the code to the computing resource based on a request from a user to access a web site that the code may implement. The computing resource may include a physical computing resource and/or a virtual machine that may instantiate the web site. The code quality service may identify a configuration of the computing device to the deployment module based on for, example, a validation quality and/or a development quality of the code when available, or a default quality otherwise. The configuration may include a security level, a processing power, a memory size, a priority level for executing the code, and a routing requirement on a network of the open platform. In turn, the deployment module may use this configuration to select and/or instantiate the proper computing resource.

At operation 704, the code quality service may determine the operational quality of the code. To do so, the code quality service may monitor operational metrics, such as CPU usage, memory usage, latencies, other metrics associated with hosting the code on the computing machine. These metrics can be compared to a checklist to generate the operational quality. The code quality service may customize the checklist based on a validation quality and/or a development quality of the code, when available. Otherwise, the code quality service may use a default checklist. The checklist may allow the code quality service to generate the operational quality based on a comparison of the operational metrics to various criteria, rules, weights, and formulas.

At operation 706, the code quality service may provide information about the operational quality to the merchant with a description of the quality and a recommendation about the code. The description of quality may include information about what the operational quality may mean, how this quality was assessed, and actual costs associated with hosting the code at this quality. The recommendation may include recommended code changes that may improve the code quality. Similar information may also be provided to the service provider and/or may be stored by the code quality service.

At operation 708, the code quality service may determine whether an update to the deployment of the code may be needed. This may include, for example, redeploying the code to another computing resource of the open platform. This may also include updating a deployment module responsible for deploying the code with an indication that for, subsequent requests from consumers for the web site, a new configuration of a computing resource should be used. Several parameters may drive the update. A first parameter may include receiving a request from the merchant and/or the service provider for redeployment. For instance, based on the description provided at operation 706, the merchant may opt for the redeployment. Another parameter may include the operational quality itself. For example, when the code was initially deployed, the code quality service may have supported the deployment based on a validation quality and/or a development quality or based on an assumed or default quality. However, in operation, the operational quality may be different from any of these qualities. Accordingly, to better match the operational quality to a proper computing resource, the redeployment may be triggered. If the update is needed, the code quality service may perform operation 714 to facilitate the redeployment. Otherwise, the code quality service may perform operation 712.

At operation 710, the code quality service may determine whether a modification to the code should be received. At this point in the process, there may not be a need to redeploy the code. However, if changes are made, redeployment may be needed. As such, at this operation, the code quality service may monitor whether such changes should be received. For example, after providing the merchant with information about the operational quality, the code quality service may expect the merchant to submit modified code if the operational quality is too low or if a discrepancy between the operational quality and a validation quality or development quality is too high. If there are no expected modifications, the example flow of FIG. 7 may end. Otherwise, operation 712 may be performed.

At operation 712, a modified code may be received. This modification may be initiated by the merchant or, if authorized, by the service provider. In an example, the modified code may be received by the deployment module and analyzed by the code quality service. More particularly, the code quality service may compare the modified code to the initial code to determine modifications and may determine improvement to the operational qualities based on the modifications. In an example, if the modifications are in line with the recommendation provided at operation 706, the code quality service may assume that the operational quality may have been improved as indicated in the recommendation. Based on this assessment, the code quality service may identify to the deployment module a new configuration for a computing resource suited to host the code at the improved operational quality. In turn, the deployment module may deploy the new code accordingly.

At operation 714, the code quality service may facilitate the redeployment of the code based on the operational quality. At this point in the flow, the code quality service may have determined that the operational cost may be different from an initial assessed quality (e.g., a validation, development, and/or default quality) and that this difference should be served by redeploying the code to a more proper computing resource. As such, and for example, the code quality service may determine an acceptable configuration of a computing resource that may properly host the code at an acceptable cost. This determination may be made by querying a table that correlates between configurations and operational qualities. Once determined, the code quality service may identify the configuration, and may provide this identification to the deployment module.

Figure 8:
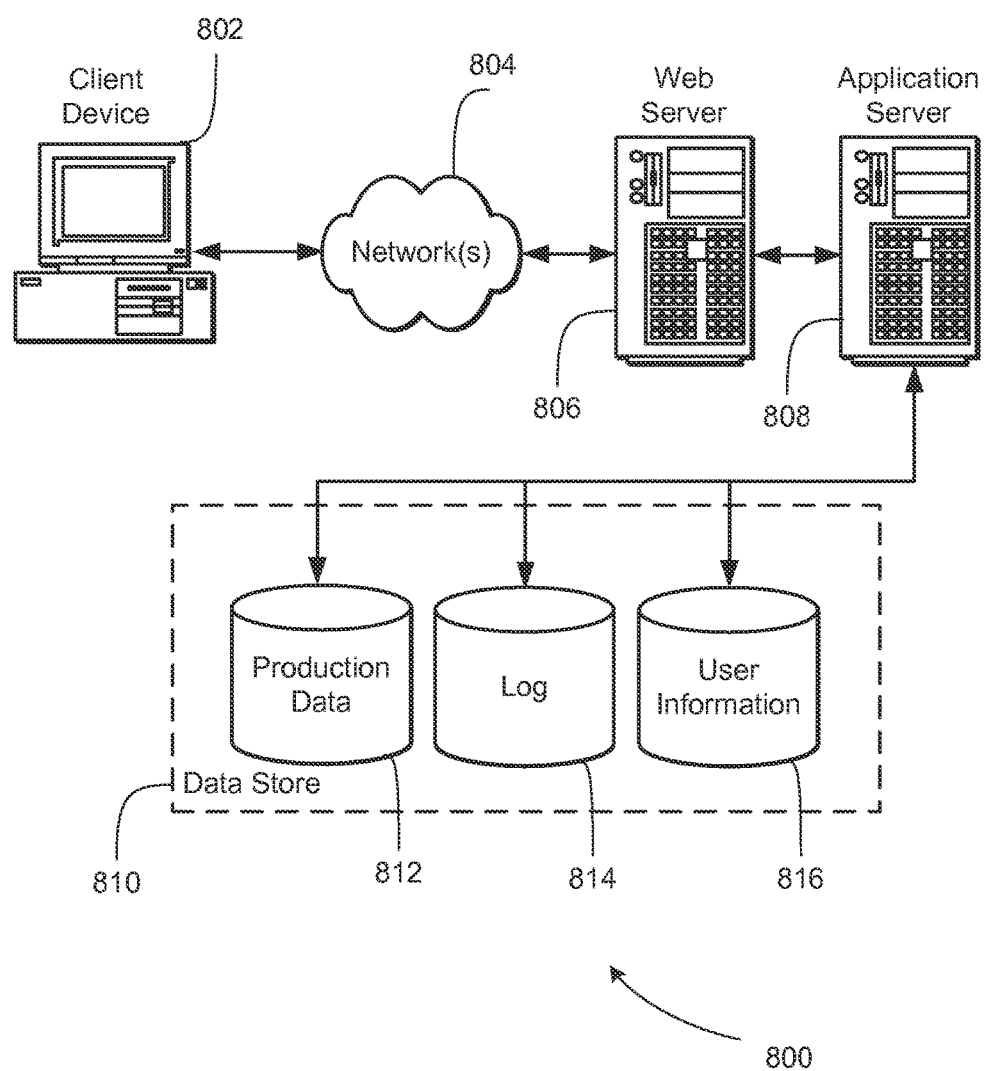
FIG. 8 illustrates an environment in which various embodiments can be implemented.

Turning to FIG. 8, that figure illustrates aspects of an example environment 800 capable of implementing the above-described structures and functions. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network(s) 804 and convey information back to a user of the device. Examples of such client devices include personal computers, cell phones, handheld messaging devices, laptop computers, set-top boxes, personal data assistants, electronic book readers, or any other computing device. The network(s) 804 can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and/or retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

the data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a web page that the user is able to view via a browser on the client device 802. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of environment 800 in FIG. 8 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules or other data, including RAM, ROM, EEPROM, flash memory or other memory technology, CD-ROM, DVD, or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z in order for each to be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   determining, by a development tool, a set of parameters for estimating a computational cost for hosting code on an open platform, the set of parameters determined based at least in part on a desired grade of the code;
   evaluating, by the development tool, an actual grade of the code based at least in part on the set of parameters;
   in response to a determination that the actual grade meets or exceeds the desired grade, submitting the code to the open platform at the desired grade; and
   in response to a determination that the desired grade exceeds the actual grade:
      receiving a modification to the desired grade such that the actual grade meets or exceeds the modified desired grade;
      determining an other set of parameters for estimating the computational cost, the other set of parameters determined based at least in part on the modification; and submitting the code to the open platform based at least in part on the computational cost estimated according to the other set of parameters.

2. The computer-implemented method of claim 1, wherein the development tool is integrated with at least one of: an editor, a compiler, or debugger of a software development kit.

3. The computer-implemented method of claim 1, wherein the desired grade is received based on a user selection, and wherein the development tool stores a rule for applying the set of parameters to the code to evaluate the actual grade.

4. The computer-implemented method of claim 3, wherein the rule specifies weights corresponding to the set of parameters based at least in part on the desired grade.

5. The computer-implemented method of claim 1, wherein the set of parameters comprises at least one of: a semantic check, a syntactic check, a code coverage measure, an application programming interface (API) version, a number of API calls, a code complexity measure, a size of data associated with API calls, a latency measure, a simulated operational metric, or an emulated operational metric.

6. One or more non-transitory computer-readable storage media comprising instructions that, when executed with one or more processors, cause a system implementing a development kit to at least:
identify a first quality associated with code to be hosted on a platform;
determine a set of parameters for estimating a cost associated with hosting the code on the platform, the set of parameters determined based at least in part on the first quality;
determine a second quality of the code based at least in part on estimating the cost according to the set of parameters;
determine whether the second quality meets or exceeds the first quality;
based at least in part on the second quality meeting or exceeding the first quality, submit the code to the platform at the second quality or the first quality; and
based at least in part on the first quality exceeding the second quality, recommend a modification to the code to improve the second quality such that the second quality exceeds or meets the first quality, the modification determined based at least in part on the set of parameters.

7. The one or more computer-readable storage media of claim 6, wherein the set of parameters are determined from a checklist.

8. The one or more computer-readable storage media of claim 7, wherein the checklist changes based at least in part on a quality of the code, and wherein the checklist specifies parameters, weights, and rules based on the quality.

9. The one or more computer-readable storage media of claim 7, wherein the cost comprises a computational cost for hosting the code, wherein the checklist comprises weights applicable to the set of parameters for estimating the computational cost, wherein the weights are based at least in part on potential contributions of the respective parameters to the computational cost.

10. The one or more computer-readable storage media of claim 9, wherein the set of parameters are applied to features of the code to estimate the cost, and wherein the modification indicates a change to a feature of the features based at least in part on a contribution of the feature to the cost.

11. The one or more computer-readable storage media of claim 10, wherein the instructions, when executed with the one or more processors, further cause the system to at least:
access modified code based at least in part on recommending the modification;
determine that the modified code is associated with a third quality that meets or exceeds the first quality; and
submit the modified code to the platform at the third quality.

12. The one or more computer-readable storage media of claim 11, wherein the instructions, when executed with the one or more processors, further cause the system to at least:
access modified code based at least in part on recommending the modification;
determine that the modified code comprises the modification; and
submit the modified code to the platform at the second quality.

13. A system comprising:
one or more processors;
one or more computer-readable storage media comprising instructions that, when executed with the one or more processors, cause the system to at least:
identify a first quality associated with code to be hosted on a computing resource;
determine a checklist associated with determining a second quality of the code, the checklist comprising a set of parameters based at least in part on the first quality;
determine the second quality of the code based at least in part on utilizing the set of parameters to estimate a cost associated with hosting the code on the computing resource;
provide, based at least in part on a comparison of the first quality and the second quality, at least one of: an option to submit the code to the computing resource at the second quality based at least in part on the second quality exceeding or meeting the first quality, or a recommendation to modify the code based at least in part on an improvement to the second quality such that the second quality exceeds or meets the first quality.

14. The system of claim 13, wherein the computing resource is associated with an open platform of a provider, wherein the instructions, when executed with the one or more processors, further cause the system to at least provide an interface configured to receive a selection associated with a user for the first quality from selectable code quality levels, and wherein the code is hosted on the computing resource on behalf of the user.

15. The system of claim 14, wherein the comparison indicates that the first quality exceeds the second quality, and wherein providing the recommendation comprises providing an incentive to modify the code relative to submitting the code unmodified at the second quality, wherein the incentive comprises at least one of: a reduced fee of the provider for running the code on the open platform, an access of the user to a beta release of a functionality of the open platform, or a reduced flow of the provider for deploying the code on the open platform.

16. The system of claim 13, wherein the computing resource is associated with a provider, wherein the instructions, when executed with the one or more processors, further cause the system to at least receive an update to the checklist from a quality service of the provider.

17. The system of claim 16, wherein the update is based at least in part on historical computational costs associated with a plurality of codes hosted on the computing resource on behalf of a plurality of users.

18. The system of claim 16, wherein the code is associated with a user, and wherein the update is based at least in part on historical submissions of codes of the user to the computing resource.

19. The system of claim 13, wherein the instructions, when executed with the one or more processors, further cause the system to at least:
- access modified code based at least in part on the recommendation;
- determine an other checklist based at least in part on the second quality, the other checklist comprising an other set of parameters;
- determine a third quality of the code based at least in part on applying the other set of parameters to estimate the cost; and
- provide an option to submit the modified code to the computing resource at the third quality based at least in part on the third quality exceeding or meeting the first quality.

20. The system of claim 13, wherein the improvement to the second quality is based at least in part on determining an improvement to the cost according to the set of parameters.

* * * * *